(12) United States Patent
Norris

(10) Patent No.: US 12,219,968 B2
(45) Date of Patent: Feb. 11, 2025

(54) SMOKE GENERATOR

(71) Applicant: Norris Manufacturing Inc., Tippecanoe, IN (US)

(72) Inventor: Aaron Lee Norris, Mentone, IN (US)

(73) Assignee: Norris Manufacturing Inc., Tippecanoe, IN (US)

( * ) Notice: Subject to any disclaimer, the term of this patent is extended or adjusted under 35 U.S.C. 154(b) by 1015 days.

(21) Appl. No.: 17/248,950

(22) Filed: Feb. 15, 2021

(65) Prior Publication Data

US 2021/0161160 A1 Jun. 3, 2021

Related U.S. Application Data

(63) Continuation of application No. 15/942,631, filed on Apr. 2, 2018, now Pat. No. 10,932,474.

(60) Provisional application No. 62/480,743, filed on Apr. 3, 2017.

(51) Int. Cl.
*A23B 4/052* (2006.01)
*A23L 5/10* (2016.01)
*A47J 37/07* (2006.01)

(52) U.S. Cl.
CPC .......... *A23B 4/0523* (2013.01); *A23B 4/052* (2013.01); *A23L 5/17* (2016.08); *A23V 2002/00* (2013.01); *Y02A 40/90* (2018.01)

(58) Field of Classification Search
CPC .............................. A23B 4/0523; A23B 4/052
See application file for complete search history.

(56) References Cited

U.S. PATENT DOCUMENTS

| 652,531 | A | * | 6/1900 | Carlson | A23B 4/052 |
| | | | | | 99/482 |
| 2,677,038 | A | * | 4/1954 | Reynoldson | C10B 47/44 |
| | | | | | 126/59.5 |
| 3,012,124 | A | | 12/1961 | Weissman | |
| 3,513,823 | A | * | 5/1970 | Fessmann | A23B 4/0523 |
| | | | | | 99/473 |

(Continued)

OTHER PUBLICATIONS

PCT, Written Opinion, International Application No. PCT/US2018/025704, Jul. 19, 2018.

(Continued)

*Primary Examiner* — Dana Ross
*Assistant Examiner* — Lawrence H Samuels
(74) *Attorney, Agent, or Firm* — Woodard, Emhardt, Henry, Reeves & Wagner, LLP

(57) ABSTRACT

A smoker includes a smoke generator that is configured to provide a controllable method of producing smoke without creating a flame. The device includes a housing including a hopper for storing a smoking fuel within the interior of the housing. The hopper feeds the smoking fuel to a fuel conveyor that is partially within the housing and partially exterior of the housing. A motor is connected to the fuel conveyor so that operation of the motor causes the smoking fuel to move along the length of the fuel conveyor. As the smoking fuel moves along the fuel conveyor, it is heated to produce continuous smoke without producing a flame. The smoke generator is capable of controlling the quality and the quantity of the smoke produced by the smoke generator independently of the heat that is used to cook food within a cabinet of the smoker.

17 Claims, 11 Drawing Sheets

(56) References Cited

U.S. PATENT DOCUMENTS

| | | | | |
|---|---|---|---|---|
| 4,176,082 A | * | 11/1979 | West | C10B 53/02 |
| | | | | 99/473 |
| 4,886,044 A | * | 12/1989 | Best | A47J 37/0682 |
| | | | | 126/41 R |
| 5,013,567 A | | 5/1991 | Govenius | |
| 5,143,202 A | * | 9/1992 | Lehmann | B65G 33/22 |
| | | | | 222/413 |
| 6,297,477 B1 | * | 10/2001 | Gort-Barten | H05B 3/16 |
| | | | | 219/544 |
| 8,967,364 B2 | | 3/2015 | Kleine-Bruggeney et al. | |
| 2004/0226550 A1 | | 11/2004 | Hutton et al. | |
| 2005/0132902 A1 | | 6/2005 | D'Arcangelis et al. | |
| 2007/0137537 A1 | | 6/2007 | Drisdelle et al. | |
| 2012/0017773 A1 | * | 1/2012 | Milliken | A47J 37/1219 |
| | | | | 99/410 |
| 2017/0238565 A1 | * | 8/2017 | Giebel | A23B 4/0523 |

OTHER PUBLICATIONS

PCT, Search Report, International Application No. PCT/US2018/025704, Jul. 19, 2018.

* cited by examiner

SMOKE GENERATOR

REFERENCE TO RELATED APPLICATIONS

This application is a continuation of U.S. patent application Ser. No. 15/942,631, filed Apr. 2, 2018, which is hereby incorporated by reference. U.S. patent application Ser. No. 15/942,631, filed Apr. 2, 2018, claims the benefit of U.S. Patent Application No. 62/480,743, filed Apr. 3, 2017, which are hereby incorporated by reference.

BACKGROUND

Smokers are popular devices that use indirect heat rather than direct heat to slowly cook and add a smoky flavoring to food. Generally, the heat for a smoker is generated by burning wood or charcoal. A commonly used method is to place a wood or charcoal biscuit on or above a heated plate. However, it may be difficult to control the temperature at which the biscuit is burned. Additionally, burning a biscuit may create an open flame and produce ash and tars that may contaminate the food. Using wood pellets may be an effective alternative to burning a biscuit or charcoal, but wood pellets can be expensive, as most wood pellet smokers require a large amount of pellets to create heat and smoke. Thus, there is a need for improvement in this field.

SUMMARY OF THE INVENTION

To address the issues presented above, a smoke generator that is able to produce smoke in a controllable and repeatable process without producing a flame was developed. The smoke generator is capable of generating smoke using heat that is independent of the heat used to cook food in the smoker. Therefore, the quality and quantity of smoke may be refined without affecting the food that is being cooked.

In one embodiment, the smoke generator is attached to a smoker and includes a housing having an interior that encloses a hopper for storing a smoking fuel. A portion of a fuel conveyor, such as an auger having an auger shaft and a helical portion wrapped around the auger shaft, is also positioned within the interior of the housing. The fuel conveyor is in communication with the hopper so that smoking fuel from the hopper may be fed to the fuel conveyor.

The fuel conveyor is operationally attached to a motor. Operation of the motor causes the smoking fuel held by the fuel conveyor to move along the length of the fuel conveyor. As the smoking fuel moves along the fuel conveyor, a heating element heats the fuel conveyer so that smoking fuel within the fuel conveyor is heated. As smoking fuel is heated, smoking fuel generates smoke that is used to flavor food within the smoker. The temperature of the heating element may be varied using a control panel. Also, the speed of the motor may be varied to control the dwell time of the smoking fuel within the fuel conveyor. Adjusting the temperature of the heating element and the dwell time of the smoking fuel may change the characteristics of the smoke that is generated. For example, the temperature at which the smoking fuel is heated may be sufficient to create smoke yet not high enough to create a flame, thereby reducing the production of ash and tars.

The smoke generator design as described and illustrated herein concerns a number of unique and inventive aspects. Some, but by no means all, of these unique aspects are summarized below.

Aspect 1 concerns a smoke generator including a fuel conveyor having a length, wherein the fuel conveyor moves a smoking fuel fed to the fuel conveyor. A heating element is configured to heat the fuel conveyer. The smoking fuel is heated as it moves along the length of the fuel conveyor so that the smoking fuel continuously generates smoke.

Aspect 2 concerns the smoke generator of any preceding aspect, and further comprises a housing and a hopper within the housing configured to hold the smoking fuel and to feed the smoking fuel to the fuel conveyor.

Aspect 3 concerns the smoke generator of any preceding aspect, and further comprises a motor operationally attached to the fuel conveyor. The operation of the motor causes the smoking fuel to move along the fuel conveyor.

Aspect 4 concerns the smoke generator of any preceding aspect, wherein the amount of time the smoking fuel is heated within the fuel conveyor may be adjusted by changing the speed of the motor.

Aspect 5 concerns the smoke generator of any preceding aspect, wherein the smoking fuel is wood pellets.

Aspect 6 concerns the smoke generator of any preceding aspect, wherein the fuel conveyor is at an oblique angle with respect to the housing.

Aspect 7 concerns the smoke generator of any preceding aspect, wherein the fuel conveyor is positioned at an angle with respect to the housing of 4-5 degrees.

Aspect 8 concerns the smoke generator of any preceding aspect, wherein the smoking fuel moves along the length of the fuel conveyor in approximately 10 minutes.

Aspect 9 concerns the smoke generator of any preceding aspect, wherein the fuel conveyor is an auger including an auger shaft and a helical portion wrapped around the auger shaft. Operation of the motor causes the auger shaft to rotate and rotation of the auger shaft causes the smoking fuel to move along the length of the auger.

Aspect 10 concerns the smoke generator of any preceding aspect, further comprising a conveyor casing surrounding the fuel conveyor. The conveyor casing includes an inner pipe and an outer pipe.

Aspect 11 concerns the smoke generator of aspect 10, wherein the inner pipe includes an inner vent hole.

Aspect 12 concerns the smoke generator of aspect 10, wherein the outer pipe includes one or more outer vent holes.

Aspect 13 concerns the smoke generator of any preceding aspect, wherein the heating element is an electric heat tape wrapped around at least a portion of the fuel conveyor.

Aspect 14 concerns a method of generating smoke for cooking including feeding smoking fuel to a fuel conveyor having a length. The fuel conveyor is operationally attached to a motor. Next, at least a portion of the length of the fuel conveyer is heated, in turn heating the smoking fuel. The motor is then operated to move the fuel conveyor so the smoking fuel moves along the length of the fuel conveyer. Heating the smoking fuel as it moves along the length of the fuel conveyor generates smoke.

Aspect 15 concerns the method of generating smoke of aspect 14, further comprising heating the fuel conveyor at a temperature between 450° F. and 500° F.

Aspect 16 concerns the method of generating smoke of aspect 14 or aspect 15, wherein operating the motor at different speeds adjusts the dwell time of the smoking fuel within the fuel conveyer.

Aspect 17 concerns the method of generating smoke of any of aspects 14-16, wherein moving the smoking fuel along the length of the fuel conveyor takes approximately 10 minutes.

Aspect 18 concerns the method of generating smoke of any of aspects 13-17, wherein smoking fuel is fed to the fuel conveyor from a housing. The fuel conveyor is positioned at an oblique angle with respect to the housing.

Aspect 19 concerns the method of generating smoke of any of aspects 13-18, wherein the motor is operated non-continuously at predetermined time intervals.

Aspect 20 concerns the method of generating smoke of any of aspects 13-19, further comprising heating the fuel conveyor at a temperature between 650° F. and 750° F.

Aspect 21 concerns the method of generating smoke of any of aspects 13-19, wherein the fuel conveyor is heated by a heating element to a smoking temperature. The heating element is deactivated to stop producing heat when the fuel conveyor reaches the smoking temperature.

Aspect 22 concerns the method of generating smoke of aspect 21, wherein the heating element is reactivated to produce heat when the temperature of the fuel conveyor is reduced to a threshold temperature that is less than the smoking temperature.

Further forms, objects, features, aspects, benefits, advantages, and embodiments of the present invention will become apparent from a detailed description and drawings provided herewith.

DESCRIPTION OF THE ILLUSTRATED EMBODIMENTS

Figure 1:
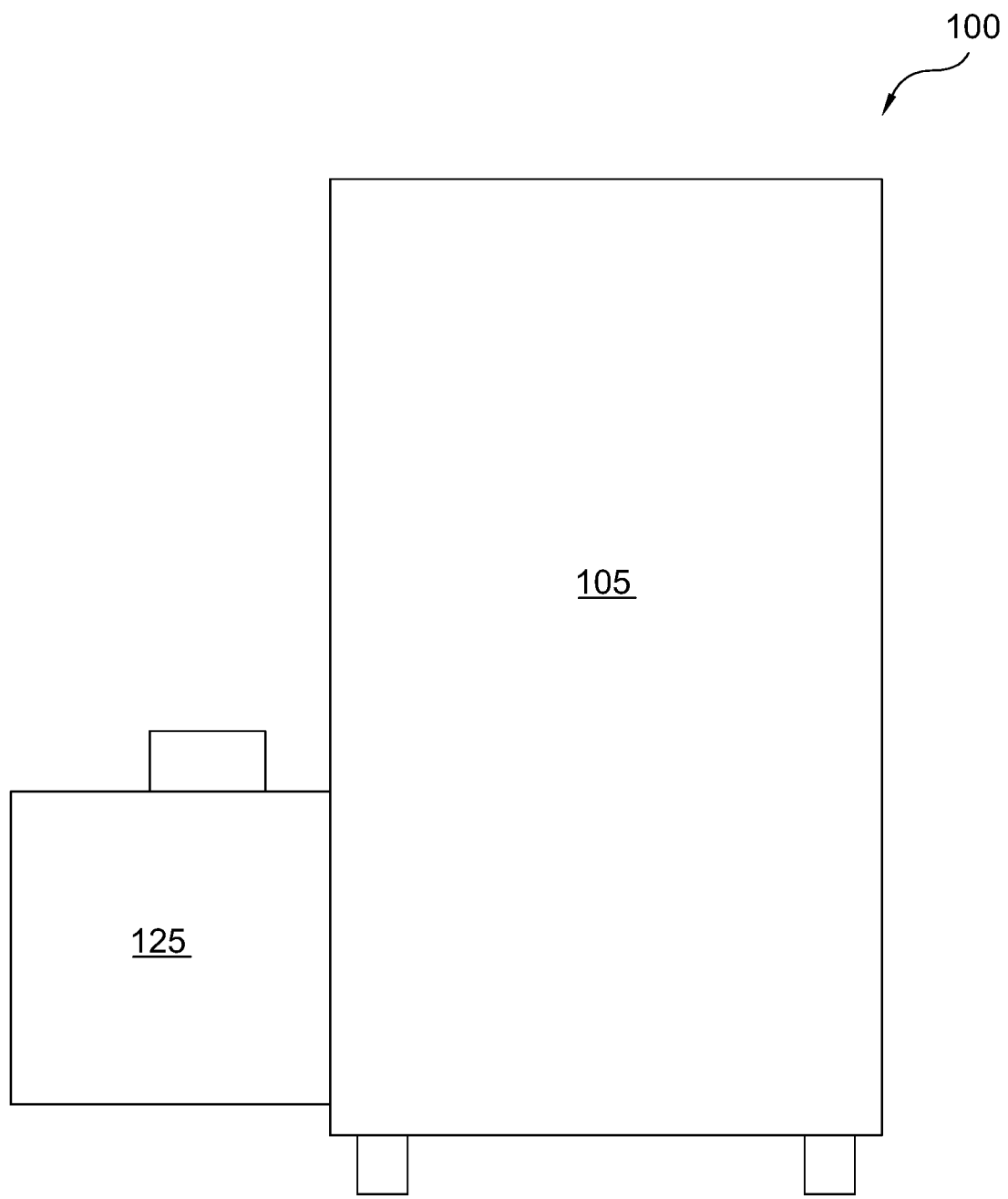
FIG. 1 is a side view of a smoker.

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles being contemplated as would normally occur to one skilled in the art to which the invention relates.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Now referring generally to the drawings, FIG. 1 illustrates an example of a smoker 100. Smoker 100 includes a cabinet 105 and a smoke generator 125 attached to one side of cabinet 105. Smoke generator 125 may be operated as a cold smoker that creates smoke to give food in cabinet 105 a smoky flavor. Smoke generator 125 may also be used while smoker 100 heats and cooks food within cabinet 105. Smoker 100 provides indirect heat to food in cabinet 105. Indirect heat requires greater cooking time than direct heat, but the indirect heat may reduce the risk of the food drying out. Alternatively or additionally, the smoke from smoke generator 125 may add additional smoke flavoring to the food. As shown in this embodiment, there is one smoke generator 125; however, in other embodiments, smoker 100 may include multiple smoke generators.

Smoke generator 125 uses a smoking fuel to generate smoke. In some embodiments, the smoking fuel may be a pellet fuel, such as wood pellets. A wood pellet is generally a small, compressed mass of compacted wood such as sawdust or recycled wood waste. The pellets are often cylindrically shaped but could take other shapes or be irregularly shaped. Other varieties of smoking fuels may also be used. For example, the smoking fuel may be wood chips, sawdust, herbs, spices, a blend of herbs and spices, coffee beans, or any other suitable material for generating a flavored smoke.

In some embodiments, smoke generator 125 creates smoke using a different heat source than the heat that is used to cook food within cabinet 105. Separating the heating smoke generator 125 and cabinet 105 allows the quality and quantity of smoke created by smoke generator 125 to be refined independently of producing heat for cooking food in cabinet 105. In these embodiments, the smoking fuel is not burned to create heat for cooking the food in cabinet 105, but instead used only to create smoke for imparting flavor to the food in cabinet 105.

Figure 2:
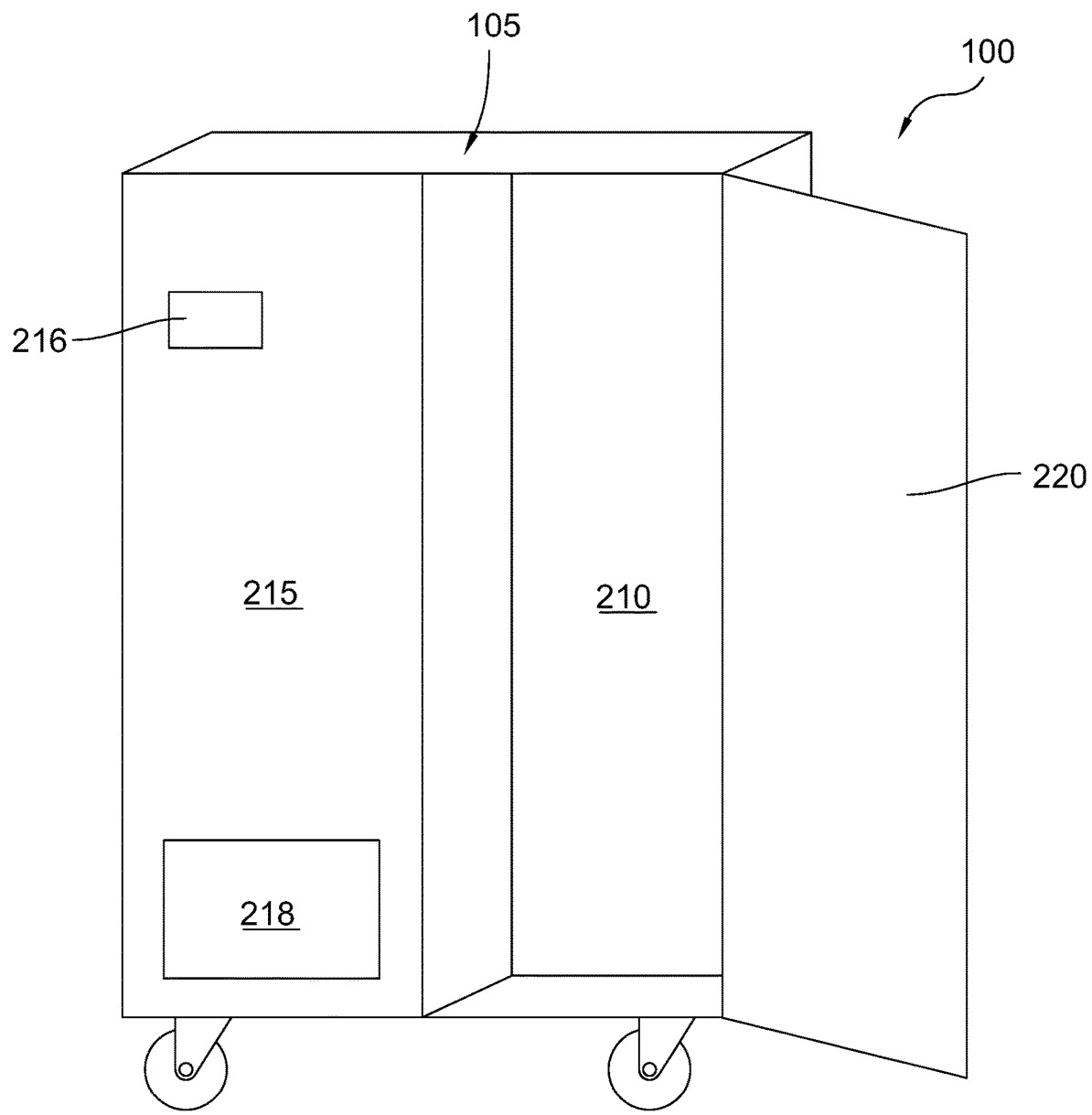
FIG. 2 is a perspective view of the smoker of FIG. 1.

As shown in FIG. 2, cabinet 105 includes a cooking area 210 and a control area 215. Cooking area 210 may include a door 220 that allows a user access to cooking area 210 to insert or remove food. Door 220 may be sealed shut while cooking so smoke cannot escape from cooking area 210.

Control area 215 holds electrical wiring and other components necessary for controlling the operation of smoker 100. As an example, control area 215 may include a control panel 216, such as a touch screen, allowing a user to control cook time, temperature, and other cooking operations. Control area 215 may also include a drawer 218 for accessing a reservoir for spent smoking fuel.

Figure 3:
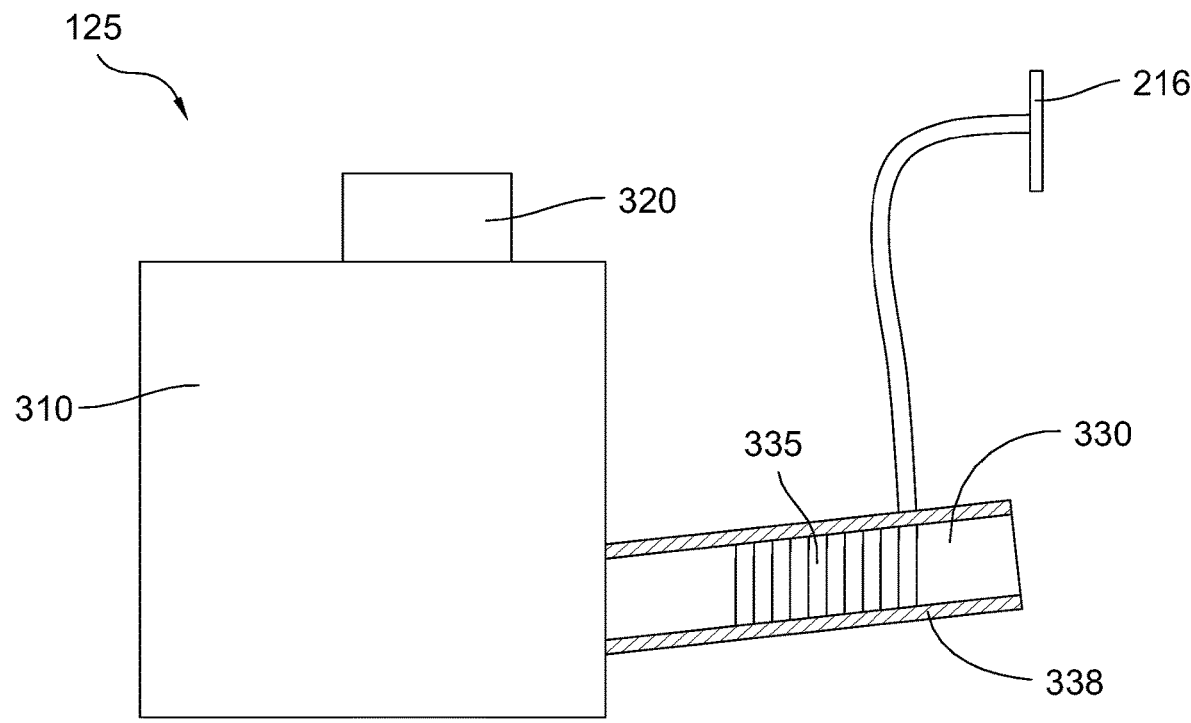
FIG. 3 is a side view of a smoke generator from the smoker of FIG. 1.

FIG. 3 shows an example of a smoke generator 125. Smoke generator 125 includes a housing 310, a hopper feed 320 and a conveyor casing 330. Housing 310 includes an interior that contains the components of smoke generator 125 needed for creating smoke. In some embodiments, housing 310 may be made from stainless steel, but any other desired material may be used.

Hopper feed 320 is positioned on top of housing 310. A smoking fuel, such as wood pellets, may be inserted into hopper feed 320 for access to the interior of housing 310. Smoking fuel may be added manually by a user, or hopper feed 320 may be configured to receive a container including the smoking fuel, whereby the container provides a supply of the smoking fuel as the smoking fuel is used by smoke generator 125. Although hopper feed 320 is shown on the top of housing 310, in other embodiments, hopper feed 320 may be positioned on one of the sides of housing 310.

Conveyor casing 330 extends from housing 310, so that smoke created by smoke generator 125 may be delivered to cooking area 210. A heating element, such as electric heat tape 335 is wrapped around at least a portion of conveyor casing 330 that is exterior of housing 310. Electric heat tape 335 operates to heat the interior of conveyor casing 330. In some embodiments, an insulation layer 338 may be wrapped around the portion of conveyor casing 330 that is exterior of housing 310 and heat tape 335. Insulation layer 338 prevents a user from burning themselves on heated conveyor casing 330 and heat tape 335 when smoker 100 is in use. Heat tape 335 may be connected to control panel 216 to allow a user to adjust the temperature generated by heat tape 335. In some embodiments, the heat provided to conveyor casing 330 may be regulated by a rheostat or a programmable logic controller that adjusts the current supplied to the heat tape 335. Adjusting the current supplied to heat tape 335 can adjust the temperature of the conveyor casing 330.

In some embodiments, the heating element may be wrapped around a 4.25 inch length of conveyor casing 330 that is exterior of housing 310. As an example, HTS/Amptek Duo-Tape® Heavy Insulated Tape may be used for heat tape 335 as the heating element.

Figure 4:
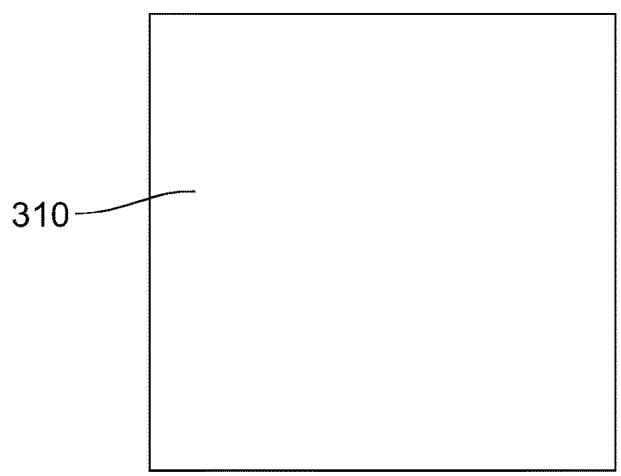
FIG. 4 is a bottom view of a housing of a smoke generator from the smoker of FIG. 1.
Figure 5:
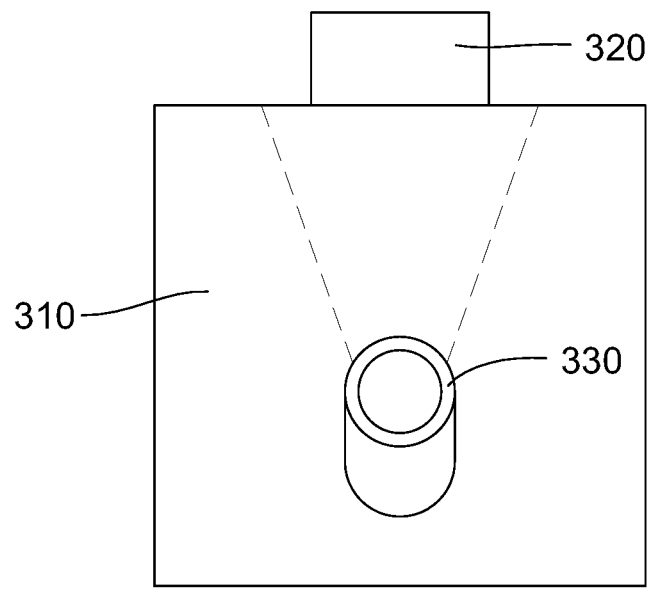
FIG. 5 is a front view of a housing of a smoke generator from the smoker of FIG. 1.

A bottom view of housing 310 of smoke generator 125 is shown in FIG. 4. Housing 310 has a rectangular footprint, but in other embodiments, housing 310 may be shaped differently. For example, housing 310 may be hexagonal. A top view of housing 310 of smoke generator 125 is shown in FIG. 5. In this embodiment, hopper feed 320 is positioned on the top surface of housing 310.

Figure 6:
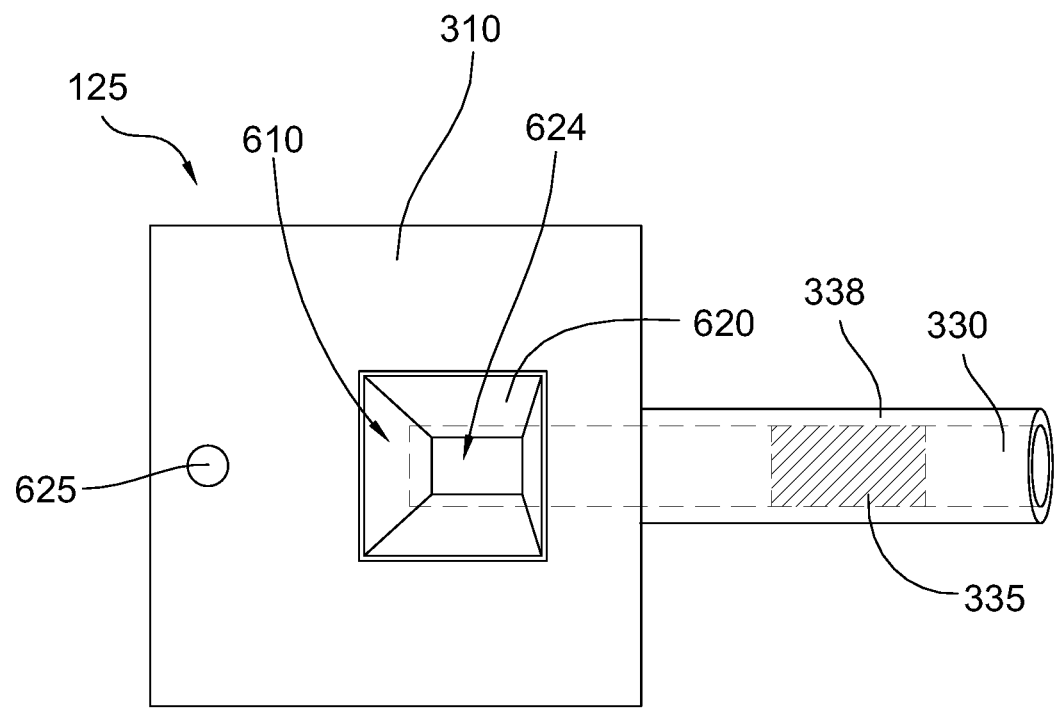
FIG. 6 is a top cross-sectional view of the smoke generator of FIG. 3.

FIG. 6 illustrates a top, cross-sectional view of smoke generator 125. Housing 310 has an interior 610 that includes a hopper 620. Hopper 620 is engaged with hopper feed 320, so that material inserted through hopper feed 320 is collected in hopper 620. A cavity 624 between hopper 620 and the portion of conveyor casing 330 within the interior of housing 310 allows material within hopper 620 to be fed into the interior of conveyor casing 330. A release button 625 on housing 310 allows a user to push button 625 to empty smoking fuel from within conveyor casing 330.

Figure 7:
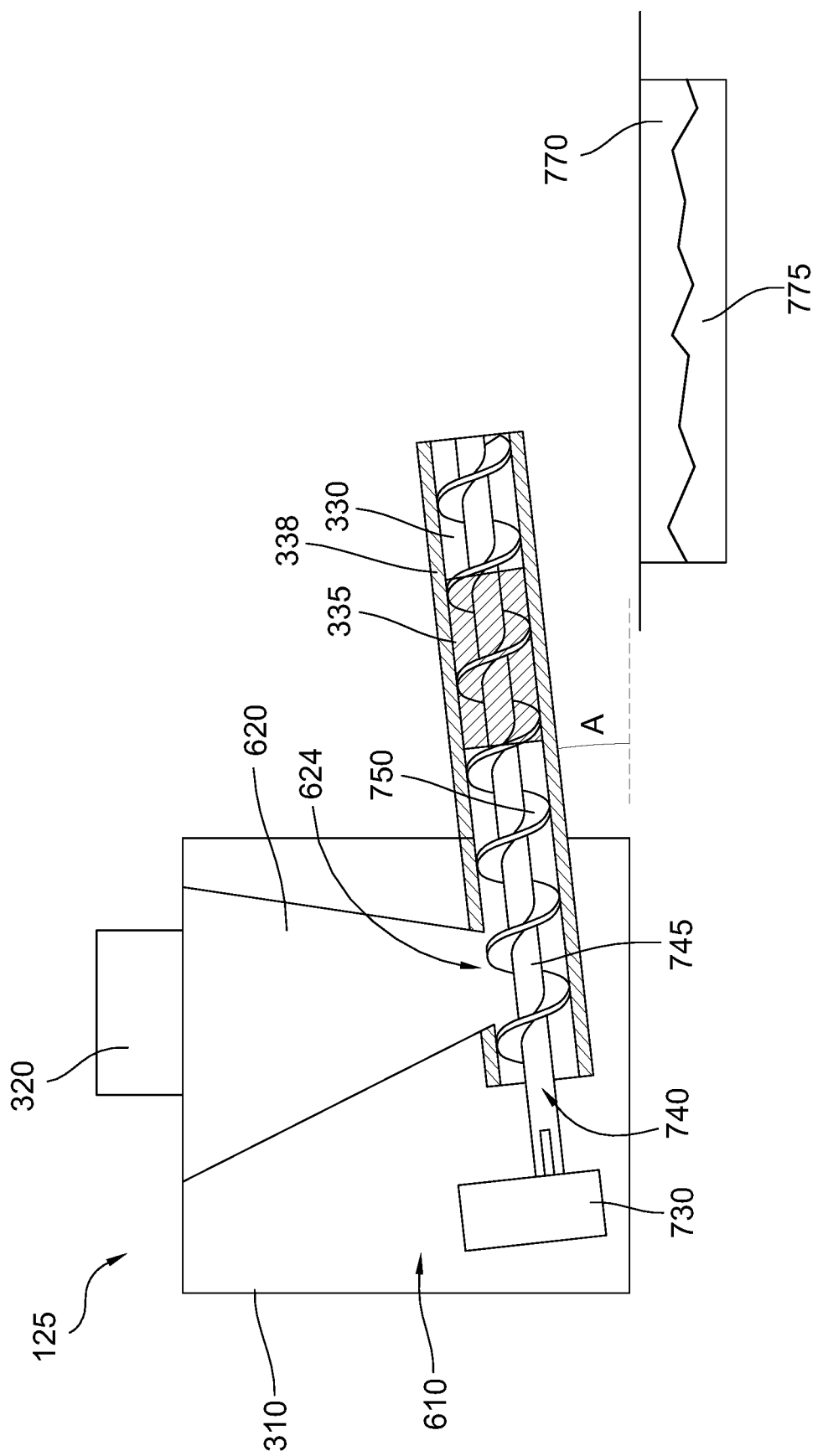
FIG. 7 is a side cross-sectional view of the smoke generator of FIG. 3
Figure 8:
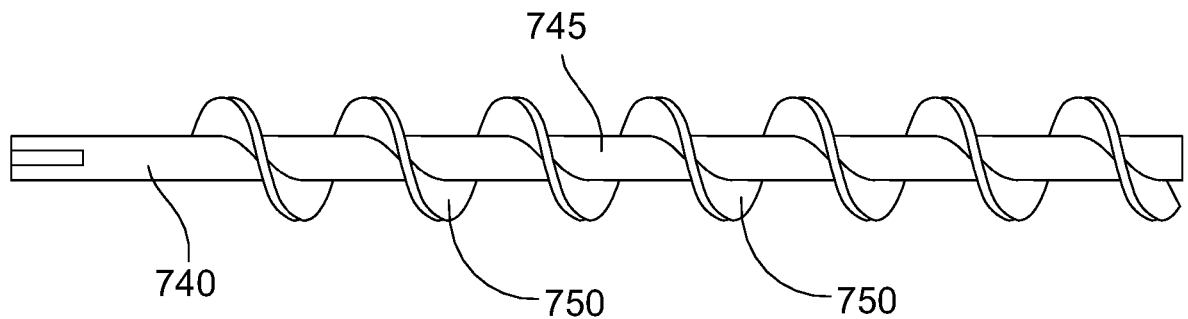
FIG. 8 is a side view of an auger from the smoke generator of FIG. 3.

A cross-sectional view of smoke generator 125 is shown in FIG. 7. Interior 610 within housing 310 includes hopper 620 and a motor 730. Motor 730 is operationally attached to a fuel conveyor, such as an auger 740, positioned within conveyor casing 330. Auger 740 includes an auger shaft 745 and a helical portion 750 wrapped around auger shaft 745 (see FIG. 8).

The rotation rate of motor 730 may be variable to allow the dwell time of the smoking fuel within the heated conveyor casing 330 to be adjusted. A slower rotation rate increases the dwell time of the smoking fuel and reduces the amount of smoking fuel used during cooking. However, increased dwell time increases the amount of heat transferred to the smoking fuel and increases the risk of burning or creating a flame that produces ash or tar. A user may also control the temperature of the smoking fuel by adjusting the dwell time of the smoking fuel on the fuel conveyer. Longer dwell times lead to higher temperatures while shorter dwell times produce lower temperatures. The user can choose a dwell time so the smoking fuel reaches a desired temperature, such as a temperature where the smoking fuel produces smoke but does not produce a flame.

Auger 740 is positioned at an oblique, upward angle, A, with respect to housing 310. This angle helps to produce a chimney effect that encourages the smoke to rise upward, to fill cooking area 210 of the cabinet 105. The angle also helps to reduce back feed of the smoke toward smoke generator 125. In one embodiment, auger 740 has a diameter of 1.5 inches, a length of 12 inches and a pitch of 1 inch, so that the angle of auger 740 with respect to housing 310 is approximately 4-5 degrees.

A reservoir 770 is positioned below the end of auger 740 that is exterior of housing 310. Once the smoking fuel has been rotated through the length of auger 740, the spent fuel is deposited into reservoir 770. Reservoir 770 may contain a cooling liquid 775, such as water, that reduces the heat of the fuel and allows for safe disposal of the spent fuel after use.

Figure 9:
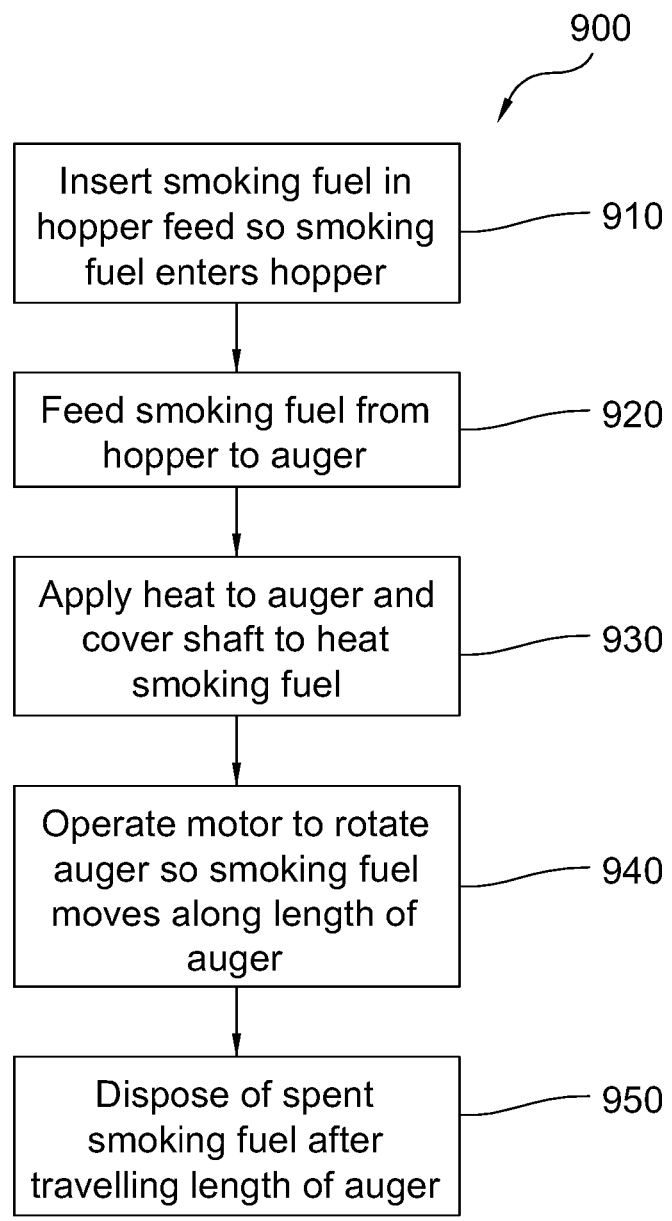
FIG. 9 is a flowchart for a method for generating smoke with the smoker of FIG. 1.
Figure 10:
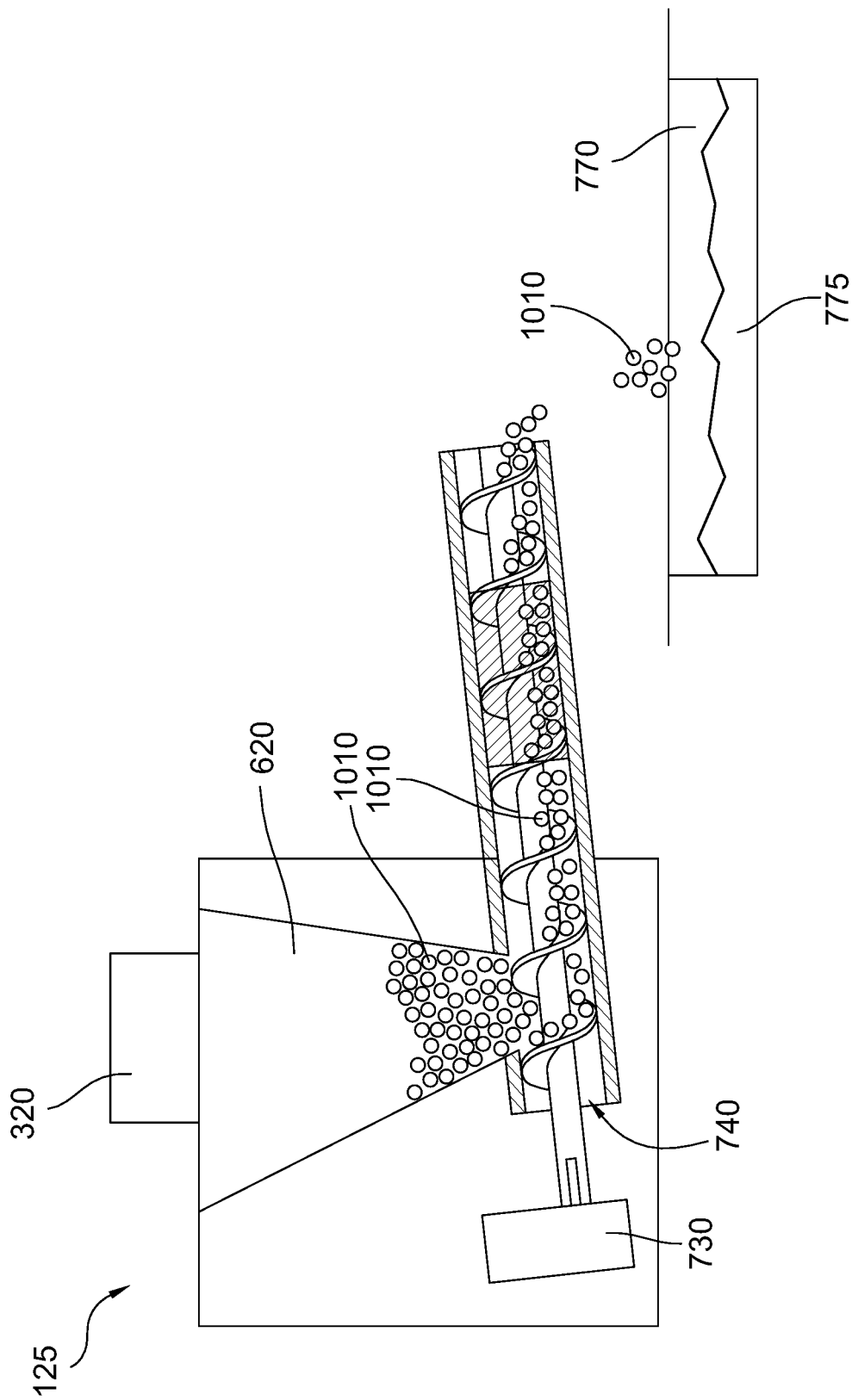
FIG. 10 is a cross-section side view of the smoke generator of FIG. 3 with smoking fuel.

A method for generating smoke 900 is shown in FIG. 9. A smoking fuel, such as wood pellets 1010 (see FIG. 10), is inserted 910 into hopper feed 320 so that the smoking fuel is then held within hopper 620. Hopper 620 is in communication with conveyor casing 330 and auger 740 so that wood pellets 1010 held in hopper 620 are fed 920 to auger 740. Electric current is provided to heat tape 335 so that heat is applied 930 to conveyor casing 330 and auger 740 so the wood pellets 1010 within conveyor casing 330 are heated. The heat and smoke produced from heating the wood pellets 1010 is directed to cooking area 210 of cabinet 105 to provide smoke flavoring to any food within cooking area 210.

As the wood pellets 1010 within conveyor casing 330 are heated, motor 730 rotates 940 auger shaft 745 and helical portion 750 to move the wood pellets 1010 along the length of auger 740. When a wood pellet reaches the end of auger 740, the spent pellet is disposed of in stage 950 by dropping the pellet into reservoir 770 that includes a cooling liquid, such as water. The cooling liquid in reservoir 770 reduces the temperature of the pellet and helps to mitigate the risk of a fire.

The wood pellets are heated to a temperature that produces smoke, but the temperature is maintained below the ignition point of the wood pellets so that a flame does not form. This reduces the risk of producing tars or ash that may contaminate the food being cooked. Also, the risk of a fire is greatly reduced because there are no open flames created by the smoke generator. In some embodiments, the preferred temperature operating range is 450° F. to 475° F. An optional safety limit may be set so that the operating temperature does not exceed 500° F. In some embodiments, this temperature range combined with the setup of smoke generator 125 can produce smoke within 15 minutes of starting operation. The temperature setting for smoker 100 may be set to a fixed temperature or, in some embodiments, the temperature may be adjustable by the user.

In one embodiment, motor 730 is configured to rotate auger shaft 745 at a speed of 0.5 rotations per minute so that a single wood pellet has a dwell time in auger 740 of approximately 10 minutes. The feed time of pellets from hopper 620 to auger 740 is 0.25 pounds of pellets per hour. For typical wood pellets having a diameter of about ⅛ inches and a length of ½ inches, this configuration allows for only about 2 pounds of pellets to be used for 8 hours of cooking time. This provides an advantage over other smokers that may require more pellets for the same amount of smoke time.

In some embodiments, wood pellets used as smoking fuel may be pre-packaged in a container such as a canister. The canister may be configured to fit on top of hopper feed 320 to provide a supply of smoking fuel as smoke generator 125 is operated without requiring manually adding additional pellets. The pre-packaged pellets may include a pre-determined quantity needed for a specified smoking time. For example, the pellets may come in a canister that includes enough pellets for 4 hours of smoking. Other canisters may have as many pellets as needed for 2, 6, or 8 hours of smoking. In some embodiments, the canisters may be clear to allow a user to see how much smoking fuel is left in the canister as it is being used.

Figure 11:
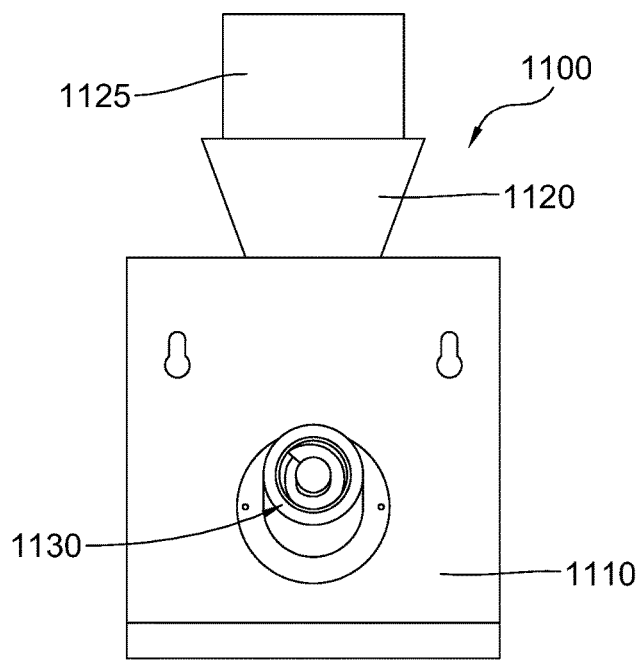
FIG. 11 is a front view of an embodiment of a smoke generator.
Figure 12:
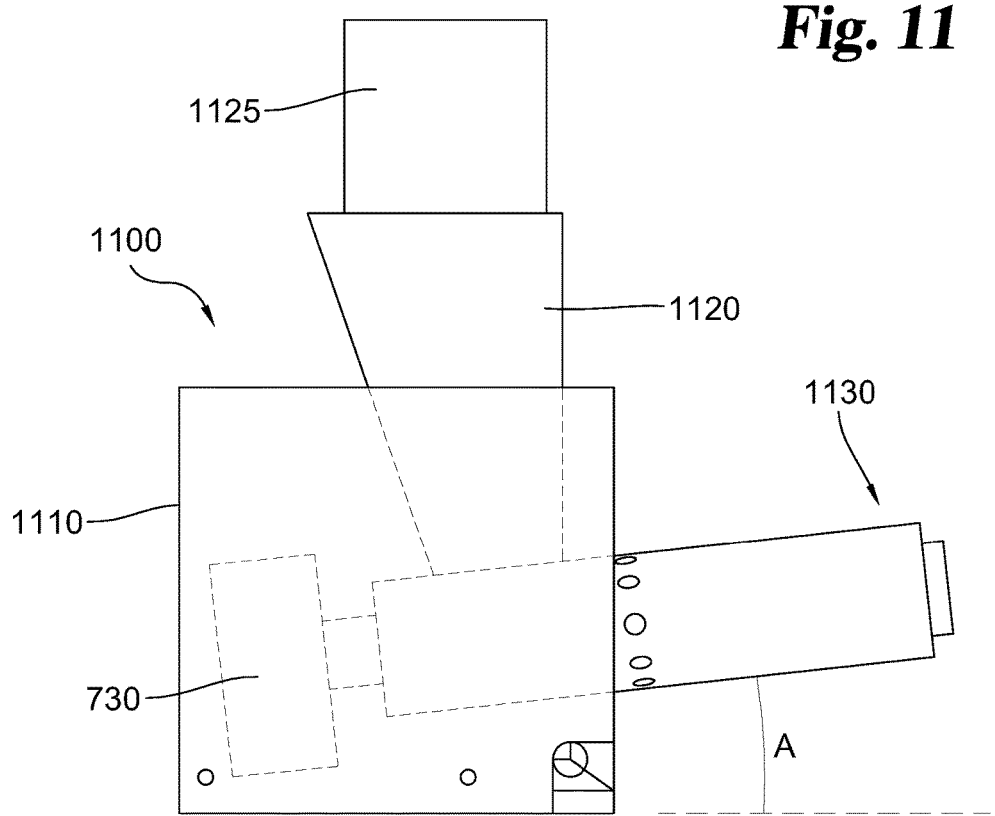
FIG. 12 is a cross-sectional side view of the smoke generator of FIG. 11.

An embodiment of a smoke generator 1100 is shown in FIGS. 11-12. Smoke generator 1100 includes a housing 1110, a hopper 1120, and a conveyor casing 1130. Housing 1110 includes an interior that contains the components of smoke generator 1100 needed for creating smoke. In some embodiments, housing 1110 is made from stainless steel, but any other desired material may be used.

A bottom portion of hopper 1120 is positioned within housing 1110 and a top portion of hopper 1120 extends outside of housing 1110. Hopper 1120 includes an open interior area for holding smoking fuel. In some embodiments, hopper 1120 includes a hopper feed extension 1125. A smoking fuel, such as wood pellets, is inserted into hopper feed extension 1125 so that the smoking fuel is fed into hopper 1120 within the interior of housing 1110. Smoking fuel may be added manually by a user, or hopper feed extension 1125 may be configured to receive a container including the smoking fuel, whereby the container provides a supply of the smoking fuel as the smoking fuel is used by smoke generator 1100.

Figure 13:
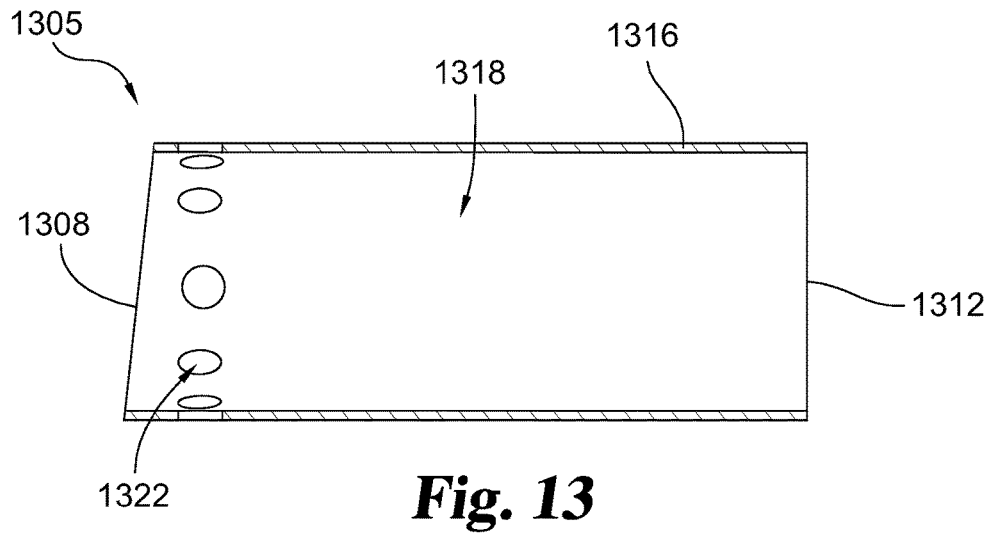
FIG. 13 is a side view of an outer pipe for the smoke generator of FIG. 11.

Conveyor casing 1130 encloses a fuel conveyor that extends from housing 310, so that smoke created by smoke generator 1100 is delivered to the cooking area of a cabinet. Conveyor casing 1130 includes an outer pipe 1305 (see FIG. 13) that has a hopper end 1308 and a cabinet end 1312. Hopper end 1308 of outer pipe 1305 is attachable to hopper 1110 and cabinet end 1312 is attachable to a cabinet. Outer pipe 1305 includes an outer wall 1316 that defines an opening 1318 that extends from the hopper end 1308 to the cabinet end 1312. One or more outer vent holes 1322 are defined through the outer wall 1316 of outer pipe 1305, allowing heated gas within opening 1318 to escape to the surrounding environment and preventing the heated gas from entering into hopper 1110 and prematurely burning the smoking fuel held within hopper 1110.

Figure 14:
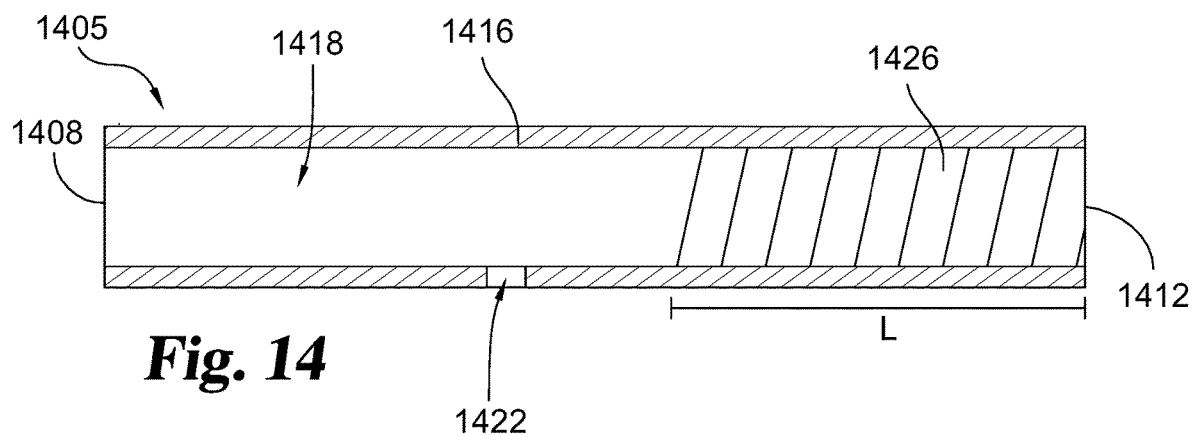
FIG. 14 is a side view of an inner pipe for the smoke generator of FIG. 11.

An inner pipe 1405 (see FIG. 14) fits at least partially within the opening 1318 of outer pipe 1305. Inner pipe 1405 includes a hopper end 1408 and a cabinet end 1412 that correspond to the hopper end 1308 and the cabinet end 1312 of outer pipe 1305. Inner pipe 1405 includes an outer wall 1416 that defines a hollow interior pathway 1418 that extends from the hopper end 1408 to the cabinet end 1412 of inner pipe 1405. An inner vent hole 1422 is defined through a portion of the outer wall 1416 of inner pipe 1405. Inner vent hole 1422 promotes a chimney effect within inner pipe 1405 allowing colder air to enter inner pipe 1405 to push heated air within interior pathway 1418 out of the cabinet end 1412 of inner pipe 1405 and into the cabinet of the smoker.

A heating element, such as electric heat tape or trace tape 1426 is wrapped around a portion of inner pipe 1405 beginning at the cabinet end of inner pipe 1405 and extends a length, L, along the inner pipe 1405. The trace tape 1426 does not extend to the hopper end 1408 of the inner pipe 1405 to prevent heat from the trace tape 1426 from entering the hopper 1110 and burning the smoking fuel held within hopper 1110. In some embodiments, the length L that the trace tape 1426 is wrapped around the inner pipe 1405 is equal to six inches from the cabinet end 1412 of inner pipe 1405.

Figure 15:
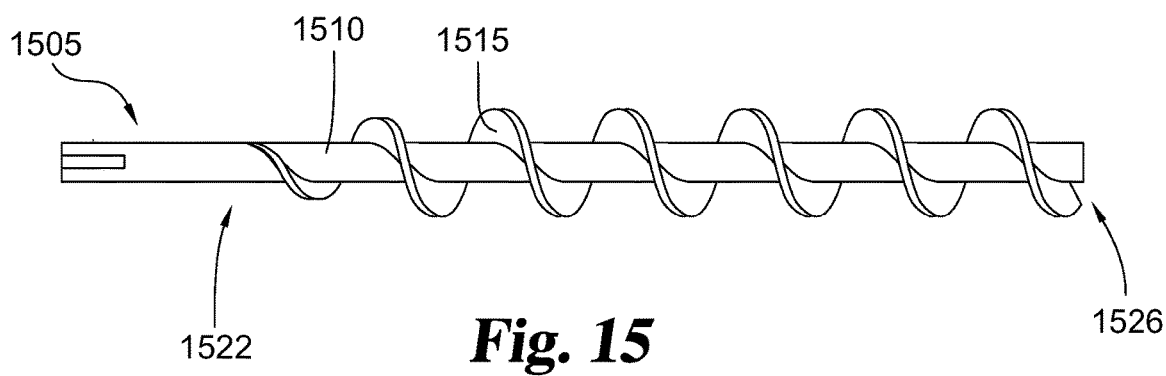
FIG. 15 is a side view of an auger for the smoke generator of FIG. 11.

An auger 1505, as shown in FIG. 15, is positioned within the interior pathway 1418 of inner pipe 1405. Auger 1505 includes an auger shaft 1510 and a helical portion 1515 that is wrapped around auger shaft 1510. A housing end 1522 of auger 1505 attaches to the housing 1110 of smoke generator 1100 and a cabinet end 1526 of the auger 1505 is attached to the cabinet of a smoker to deliver smoke to the cabinet. Smoking fuel is fed from hopper 1110 into the interior pathway 1418 of inner pipe 1405 where the smoking fuel comes into contact with auger 1505. As auger 1505 is rotated, helical portion 1515 moves the smoking fuel linearly along the auger shaft 1510. In some embodiments, the helical portion 1515 of auger 1505 near the housing end 1522 is tapered so that the diameter of helical portion 1515 at the housing end is smaller than the diameter of the helical portion 1515 at the cabinet end 1526. The tapered helical portion 1515 allows for easier pick up of the smoking fuel as it exits the housing 1110 and enters the conveyor casing 1130.

Auger 1505 and conveyor casing 1130 are positioned at an oblique, upward angle, A, with respect to housing 1110 (see FIG. 12). This angle helps to produce a chimney effect that encourages smoke to rise upward, to fill cooking area 210 of the cabinet 105. The angle also helps to reduce back feed of the smoke toward smoke generator 1100.

Figure 16:
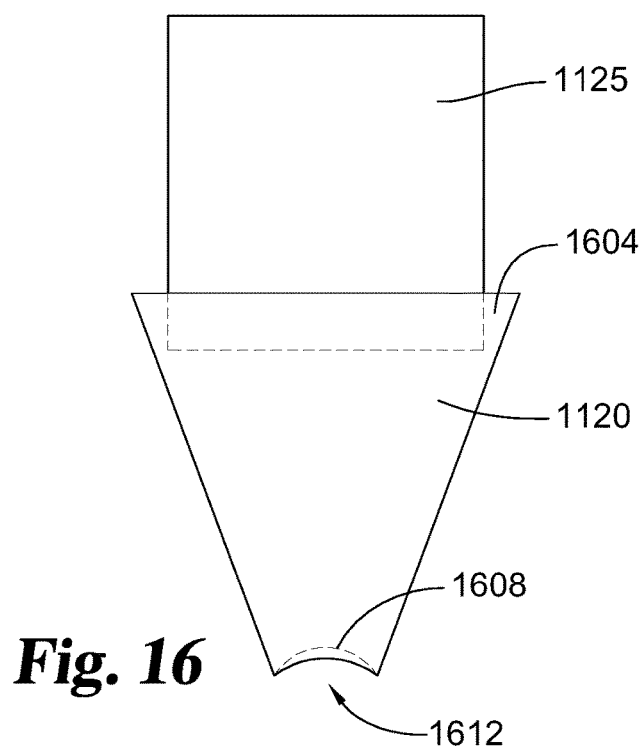
FIG. 16 is a front view of a hopper and a hopper feed extension for the smoke generator of FIG. 11

FIG. 16 illustrates the hopper 1120 of smoke generator 1100. The hopper 1120 includes an entrance section 1604 and an exit section 1608. Hopper feed extension 1125 is attached to hopper 1120 so that hopper feed extension 1125 extends from entrance section 1604. Hopper feed extension 1125 provides extra storage area for smoking fuel that is stored in hopper 1120 and can make it easier for smoking fuel to be added to hopper 1120. The exit section 1608 is positioned within housing 1110 when hopper 1120 is attached to housing 1110 and includes a cavity 1612 that feeds smoking fuel within hopper 1120 to the conveyor casing 1130. In this embodiment, exit section 1608 is concave; however in other embodiments exit section 1608 may have any suitable shape.

Figure 17:
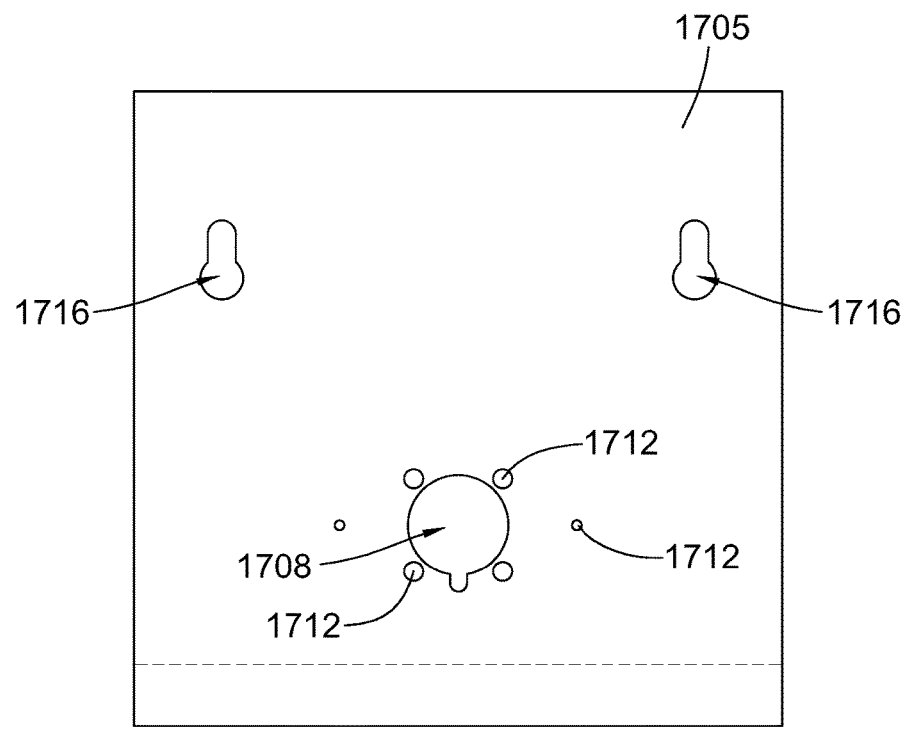
FIG. 17 is a front view of a cover for the housing of the smoke generator of FIG. 11.

A cover 1705 for housing 1110 is shown in FIG. 17. Cover 1705 defines a conveyor casing opening 1708 for receiving conveyor casing 1130. Attachment openings 1712 surrounding conveyor casing opening 1708 provide attachment points for securing a plate or other form of covering to seal the conveyor casing opening 1708 after the conveyor casing 1130 has been received. Cabinet slots 1716 are defined through cover 1705 and allow clearance for bolts or other features that may be used to attach housing 1110 to the cabinet of a smoker.

Figure 18:
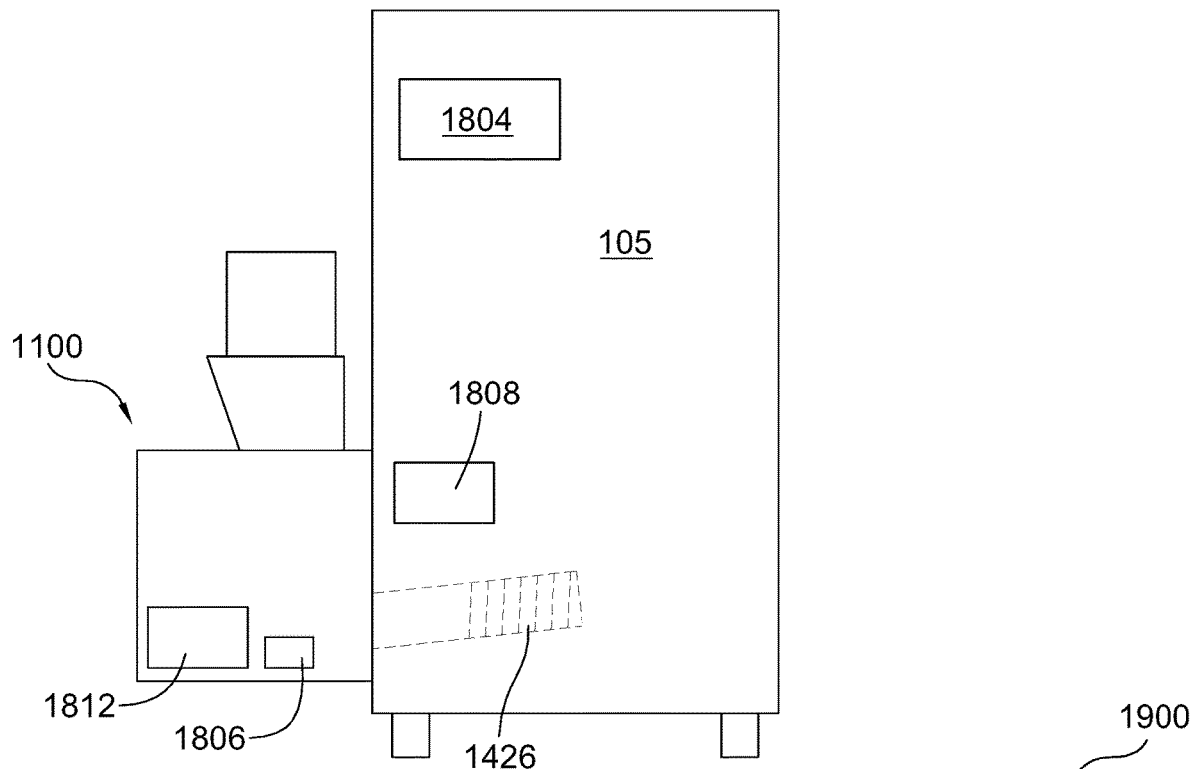
FIG. 18 is a schematic diagram of a smoker including the smoke generator of FIG. 11.

A controller 1804 (see FIG. 18) is used to control the supply of power to smoke generator 1100. In some embodiments, the controller is a programmable logic controller (PLC). However, in other embodiments, the controller may be a circuit board or other suitable type of control instrument. In some embodiments, controller 1804 only controls whether smoke generator 1100 is on or off, while a separate controller 1806 is used to control the operation of smoke generator 1100. In these embodiments, controller 1806 controls the speed of auger 1505 and controls the supply of electricity to trace tape 1426.

A thermocouple 1808 may be included near trace tape 1426 to provide temperature data to a controller. In some embodiments, it is preferred that the temperature within inner pipe 1405 for heating the smoking fuel is maintained between 650° F.-750° F. However, in other embodiments the maximum temperature for heating the smoking fuel may be increased to 850° F. or up to 1000° F. Heating the smoking fuel at a temperature below this range could produce bad smoke, while heating the smoking fuel to a temperature above this range could create bitter or dirty smoke or start to combust the smoking fuel.

As an additional safety measure, a fuse may be included to break resistance to the trace tape 1426 if the electrical current to the trace tape 1426 becomes too high. The fuse prevents the temperature of the inner pipe from exceeding a determined maximum temperature. This maximum temperature may be a temperature at which the smoking fuel starts to combust and create a flame rather than just producing smoke.

Thermocouples or temperature sensors may be included to measure the temperature of other portions of the smoke generator 1100. In some embodiments, a temperature sensor 1812 is included in the hopper within the housing 1110 to monitor the temperature of the smoking fuel held within the hopper. In one example, a temperature sensor measures the temperature within the portion of the housing 1110 below the conveyor casing 1130 to monitor possible overheating and burning of the smoking fuel within the hopper. At a certain temperature measured by the temperature sensor, such as 100° F., the controller cuts power to the trace tape 1426 to stop heating and prevent further overheating of the housing 1110.

Figure 19:
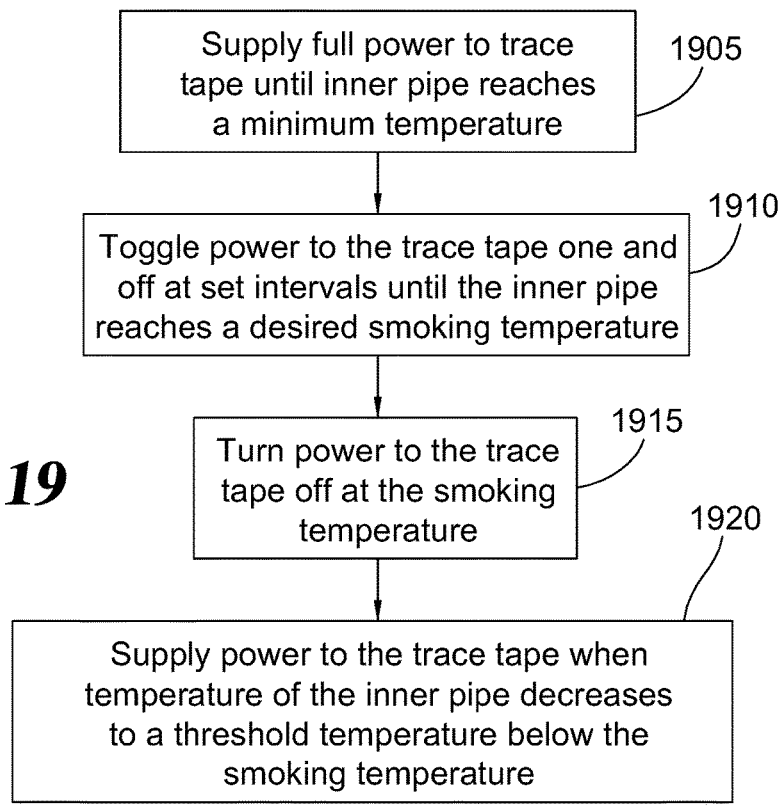
FIG. 19 is a flow chart illustrating a control process for the smoke generator of FIG. 11.

A flow chart 1900 illustrating a control process for the smoke generator 1100 is shown in FIG. 19. In a first stage 1905, full power is provided to the trace tape 1426 until the inner pipe 1405 reaches a minimum temperature. As an example, the minimum temperature for some embodiments is 625° F.

In a second stage 1910, the power to the trace tape 1426 is toggled on and off for set time intervals to slowly raise the temperature within the inner pipe 1405 to a desired smoking temperature. In some embodiments, the time interval for activating the power to the trace tape 1426 is the same as the time interval for deactivating the power to the trace tape 1426. In other embodiments, the time intervals for activating and deactivating the power to the trace tape 1426 are different. As a specific example, in some embodiments, the time intervals are ten seconds with power and three seconds without power.

The smoking temperature may be any desired temperature that is suitable for heating the smoking fuel and generating smoke. For example, it has been found that a smoking temperature of 725° F. produces an optimal flavor profile for certain meats and other foods. At this temperature, the smoking fuel is heated sufficiently to create good, flavorful smoke. Higher temperatures can ignite the smoking fuel. Cooking at lower temperatures produces bad smoke, such as a bitter or dirty smoke that will produce an unwanted flavor.

In a third stage 1915, power to the trace tape 1426 is turned off when the temperature of the inner pipe 1405 reaches the desired smoking temperature. Once power to the trace tape 1426 is deactivated, the temperature may continue to increase after power to the trace tape 1426 has turned off while residual heat is still present. However, eventually the temperature begins to decrease to a temperature below the smoking temperature as heat is no longer supplied from the trace tape 1426.

In a fourth stage 1920, at a certain threshold temperature below the smoking temperature, power is supplied to the trace tape 1426 to reheat the inner pipe 1405 to the smoking temperature. As an example, the threshold temperature may be 5° F. below the smoking temperature. To reheat the inner pipe 1405 to the desired smoking temperature, power may be supplied to the trace tape 1426 in the same manner as it is supplied to the trace tape 1426 in the second stage 1910 so that power is toggled on and off in desired time intervals. In some embodiments, the time intervals are the same as in the second stage 1910 so that power is provided for ten seconds and then turned off for three seconds. After the temperature of the inner pipe 1405 returns to the smoking temperature, the power to the trace tape 1426 is turned off until the temperature of inner pipe 1405 reduces to the threshold temperature again.

The intermittent supply of power to the trace tape 1426 keeps the inner pipe 1405 at a suitable range for generating smoke. Turning off the supply of power keeps the inner pipe 1405 from becoming too hot so that the smoking fuel is ignited, and turning the supply of power back on at a given threshold temperature keeps the inner pipe 1405 from becoming too cold and producing bad smoke.

The controller 1806 controls the dwell time and the feed rate of the smoking fuel within the inner pipe 1405 through operation of the auger 1505. In one example, the controller 1804 operates the motor 730 for five seconds and then turns off the motor 730 for ten seconds to let the smoking fuel rest within the inner pipe 1405. When activated, the motor 730 is operated at a speed of 1 rotation per minute, so the effective speed of the motor is 0.33 rotations per minute when the motor 730 is activated for five seconds and then deactivated for ten seconds. This setup allows for the use of roughly 1 cup of wood pellets per hour when wood pellets are used as the smoking fuel. Although wood pellets are given as a representative smoking fuel, other types of smoking fuels such as chunks of hardwood may be used in smoke generator 1100.

A consistent smoke is created by controlling the dwell time and the temperature of the smoking fuel within the auger 1505, reducing the risk that bad smoke is imparted to the food being cooked in the cabinet of the smoker. Operation of the auger 1505 ensures that a suitable amount of smoking fuel is used to create the smoke and reduces the risk of using either too much or too little smoking fuel. In some instances, less smoking fuel is used during cooking as the smoking fuel is not burned too quickly and the risk of using too much smoking fuel while cooking is reduced by controlling operation of the auger 1505 at a predetermined feed rate.

In some embodiments, different temperature and dwell time settings are programmed into controller 1804 for cooking different types of food. In these embodiments, each of the individual settings is optimized for cooking a specific a type of meat or a specific vegetable for a certain time and certain temperature that provides good taste.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A smoke generator, comprising:
a fuel conveyor including a conveyor casing defining an interior pathway, an auger disposed in the interior pathway, and a motor configured to rotate the auger to transport a smoking fuel within the interior pathway;
a housing having a hopper configured to supply the smoking fuel to the fuel conveyor;
wherein the conveyor casing has a hopper end at the hopper;
wherein the conveyor casing has a cabinet end where the conveyor casing extends into a cabinet;
wherein the cabinet end is located opposite to the hopper end;
a heating element configured to generate heat without a flame;
wherein the heating element is positioned to heat the conveyor casing of the fuel conveyor;
wherein the conveyor casing is configured to conduct the heat from the heating element into the interior pathway;
wherein the heat conducted by the conveyor casing into the interior pathway is configured to cause the smoking fuel in the interior pathway at the heating element to create smoke;
wherein the conveyor casing at the hopper end defines a vent hole to intake air into the interior pathway;
wherein the conveyor casing at the cabinet end has an exhaust opening to exhaust the smoke into the cabinet;
wherein the heating element is positioned along the conveyor casing between the vent hole and the exhaust opening to heat the conveyor casing of the fuel conveyor;
wherein the conveyor casing between the vent hole and the exhaust opening is solid to promote flow of the smoke in a longitudinal direction inside the interior pathway of the conveyor casing; and
wherein the conveyor casing extends from the housing at an upward oblique angle from the hopper end to the cabinet end to promote a chimney effect for the flow of the smoke to the exhaust opening.

2. The smoke generator of claim 1, further comprising:
a controller operatively connected to the motor to control operation of the auger;
the controller being configured to adjust rotation rate of the motor to control dwell time of the smoking fuel in the fuel conveyor; and
the controller being configured to control the dwell time to create smoke with the smoking fuel and inhibit flaming of the smoking fuel.

3. The smoke generator of claim 2, further comprising:
a sensor operatively connected to the controller to provide temperature of the fuel conveyor.

4. The smoke generator of claim 1, further comprising:
a hopper configured to supply the smoking fuel to the fuel conveyor.

5. The smoke generator of claim 4, further comprising:
a temperature sensor disposed in the housing to monitor for burning of the smoking fuel within the hopper.

6. The smoke generator of claim 1, further comprising: cabinet;
wherein the conveyor casing includes an inner pipe and an outer pipe;
wherein the inner pipe extends within the outer pipe;
wherein the inner pipe defines the vent hole;
wherein the outer pipe defines one or more outer vent holes; and
wherein the outer vent holes are positioned proximal the hopper end to reduce premature burning of the smoking fuel within the hopper.

7. The smoke generator of claim 6, wherein the heating element includes electric heat tape wrapped around an entire outer circumference of the inner pipe to promote even heating of the smoking fuel.

8. The smoke generator of claim 7, wherein:
the hopper end of the inner pipe is uncovered by the electric heat tape to minimize heating of the hopper; and
the vent hole is located where the inner pipe is uncovered by the electric heat tape to promote the chimney effect within the inner pipe.

9. The smoke generator of claim 1, further comprising:
a cabinet with a cooking area configured to cook food; and
wherein the cabinet has a heat source that is separate from the heating element of the fuel conveyor.

10. The smoke generator of claim 1, further comprising:
a controller being operatively connected to the heating element to control the heat generated by the heating element; and
the controller being configured to control the heating element to create smoke with the smoking fuel and inhibit flaming of the smoking fuel.

11. The smoke generator of claim 10, wherein the heating element is an electric heat tape wrapped around at least a portion of the fuel conveyor.

12. The smoke generator of claim 1, wherein the cabinet end of the conveyor casing is higher than the hopper end.

13. The smoke generator of claim 12, wherein the heating element includes electric heat tape wrapped around the conveyor casing.

14. A smoke generator, comprising:
a housing;
a fuel conveyor including a conveyor casing defining an interior pathway, an auger disposed in the interior pathway, and a motor configured to rotate the auger to transport a smoking fuel within the interior pathway;
a hopper configured to supply the smoking fuel to the fuel conveyor;
a cabinet with a cooking area configured to cook food;
wherein the conveyor casing has a hopper end at the hopper and a cabinet end at the cabinet;
wherein the conveyor casing extends at an upward oblique angle from the housing into the cabinet to encourage the smoke to rise to fill the cooking area of the cabinet;
wherein the cabinet end of the conveyor casing is higher than the hopper end;
a heating element configured to heat the fuel conveyer;
wherein the conveyor casing at the hopper end defines a vent hole to intake air into the interior pathway;
wherein the conveyor casing at the cabinet end has an exhaust opening to exhaust the smoke into the cabinet;
wherein the heating element is positioned along the conveyor casing between the vent hole and the exhaust opening to heat the conveyor casing of the fuel conveyor;
wherein the conveyor casing between the vent hole and the exhaust opening is solid to promote flow of the smoke in a longitudinal direction inside the interior pathway of the conveyor casing;
a controller operatively connected to the motor to control operation of the auger; and the controller being operatively connected to the heating element to control the heat generated by the heating element.

15. The smoke generator of claim 14, wherein:
the heating element is an electric heat tape wrapped around at least a portion of the fuel conveyor;
the controller being configured to control temperature inside the interior pathway to heat the smoking fuel to create smoke; and
the controller being configured to control the temperature inside the interior pathway to inhibit flaming of the smoking fuel.

16. The smoke generator of claim 14, further comprising:
wherein the heating element is positioned to heat the conveyor casing of the fuel conveyor; and
a sensor operatively connected to the controller to provide temperature of the fuel conveyor.

17. The smoke generator of claim 14, wherein the cabinet has a heat source that is separate from the heating element of the fuel conveyor.

* * * * *